United States Patent
Liu et al.

(10) Patent No.: US 8,713,141 B1
(45) Date of Patent: Apr. 29, 2014

(54) SYSTEM AND METHOD FOR MONITORING NETWORK ACTIVITY

(75) Inventors: Danielle Liu, Morganville, NJ (US);
David A. Hoeflin, Middletown, NJ (US);
Duncan Sparrell, Chester, NJ (US)

(73) Assignee: AT & T Intellectual Property II, LP, Atlanta, GA (US)

( * ) Notice: Subject to any disclaimer, the term of this patent is extended or adjusted under 35 U.S.C. 154(b) by 3120 days.

(21) Appl. No.: 11/288,795

(22) Filed: Nov. 29, 2005

(51) Int. Cl.
*G06F 15/173* (2006.01)

(52) U.S. Cl.
USPC ....................................................... 709/223

(58) Field of Classification Search
USPC .............. 709/205–206, 223–226; 726/22–25
See application file for complete search history.

(56) References Cited

U.S. PATENT DOCUMENTS

| | | | |
|---|---|---|---|
| 5,764,740 A * | 6/1998 | Holender | 379/112.05 |
| 6,405,318 B1 | 6/2002 | Rowland | |
| 6,745,333 B1 | 6/2004 | Thomsen | |
| 6,802,009 B1 | 10/2004 | Goodwin | |
| 6,873,600 B1 * | 3/2005 | Duffield et al. | 370/252 |
| 6,928,554 B2 | 8/2005 | Dettinger et al. | |
| 6,944,673 B2 * | 9/2005 | Malan et al. | 709/237 |
| 6,948,070 B1 | 9/2005 | Ginter et al. | |
| 6,963,983 B2 | 11/2005 | Munson et al. | |
| 7,342,923 B2 * | 3/2008 | Botvich | 370/389 |
| 7,594,260 B2 * | 9/2009 | Porras et al. | 726/13 |
| 2005/0068961 A1 * | 3/2005 | Raghunath et al. | 370/395.2 |
| 2005/0125195 A1 * | 6/2005 | Brendel | 702/182 |
| 2005/0223089 A1 * | 10/2005 | Rhodes | 709/223 |
| 2007/0150949 A1 * | 6/2007 | Futamura et al. | 726/22 |

OTHER PUBLICATIONS

Gu et al., "Detecting Anomalies in Network Traffic using Maximum Entropy Estimation", Oct. 2005.*

* cited by examiner

*Primary Examiner* — Shirley Zhang
(74) *Attorney, Agent, or Firm* — Fay Kaplun & Marcin, LLP

(57) ABSTRACT

Described is a system and method for receiving first data corresponding to usage of a network, receiving second data corresponding to usage of the network, comparing the first data to the second data and providing an indication of a network event when the second data varies from the second data greater than a predetermined threshold.

22 Claims, 11 Drawing Sheets

1500

| source IP | dest IP | next hop | if in | if out | pkts | bytes | start time | end time | s-port | d-port | pad | tcp flag | ptcl | toss | AS | d-AS | s-prefix | d-prefix | seq |
|---|---|---|---|---|---|---|---|---|---|---|---|---|---|---|---|---|---|---|---|
| 209.12.44.46 | 32.1.0.53 | 192.205.31.37 | 2 | 9 | 1 | 70 | 1015394461 | 1015394461 | 0 | 9765 | 0 | 16 | 1 | 0 | 6467 | 2686 | 16 | 8 | 50348551 |
| 209.12.44.46 | 32.3.0.53 | 192.205.31.37 | 2 | 9 | 1 | 66 | 1015394462 | 1015394462 | 0 | 9765 | 0 | 16 | 1 | 0 | 6467 | 2686 | 16 | 8 | 50348851 |
| 209.12.44.46 | 32.5.0.53 | 192.205.31.37 | 2 | 9 | 1 | 70 | 1015394464 | 1015394464 | 0 | 9765 | 0 | 16 | 1 | 0 | 6467 | 2686 | 16 | 8 | 50349211 |
| 209.12.44.46 | 32.7.0.53 | 192.205.31.37 | 2 | 9 | 1 | 66 | 1015394465 | 1015394465 | 0 | 9765 | 0 | 16 | 1 | 0 | 6467 | 2686 | 16 | 8 | 50349451 |
| 209.12.44.46 | 32.9.0.53 | 192.205.31.37 | 2 | 9 | 1 | 70 | 1015394467 | 1015394467 | 0 | 9765 | 0 | 16 | 1 | 0 | 6467 | 2686 | 16 | 8 | 50349871 |
| 209.12.44.46 | 32.11.0.53 | 192.205.31.37 | 2 | 9 | 1 | 66 | 1015394468 | 1015394468 | 0 | 9765 | 0 | 16 | 1 | 0 | 6467 | 2686 | 16 | 8 | 50350171 |
| 209.12.44.46 | 32.13.0.53 | 192.205.31.37 | 2 | 9 | 1 | 70 | 1015394470 | 1015394470 | 0 | 9765 | 0 | 16 | 1 | 0 | 6467 | 2686 | 16 | 8 | 50350561 |
| 209.12.44.46 | 32.15.0.53 | 192.205.31.37 | 2 | 9 | 1 | 66 | 1015394471 | 1015394471 | 0 | 9765 | 0 | 16 | 1 | 0 | 6467 | 2686 | 16 | 8 | 50350831 |
| 209.12.44.46 | 32.17.0.53 | 192.205.31.37 | 2 | 9 | 1 | 70 | 1015394473 | 1015394473 | 0 | 9765 | 0 | 16 | 1 | 0 | 6467 | 2686 | 16 | 8 | 50351191 |
| 209.12.44.46 | 32.19.0.53 | 192.205.31.37 | 2 | 9 | 1 | 66 | 1015394474 | 1015394474 | 0 | 9765 | 0 | 16 | 1 | 0 | 6467 | 2686 | 16 | 8 | 50351521 |
| 209.12.44.46 | 32.21.0.53 | 192.205.31.37 | 2 | 9 | 1 | 70 | 1015394476 | 1015394476 | 0 | 9765 | 0 | 16 | 1 | 0 | 6467 | 2686 | 16 | 8 | 50351851 |
| 209.12.44.46 | 32.23.0.53 | 192.205.31.37 | 2 | 9 | 1 | 66 | 1015394477 | 1015394477 | 0 | 9765 | 0 | 16 | 1 | 0 | 6467 | 2686 | 16 | 8 | 50352121 |
| 209.12.44.46 | 32.25.0.53 | 192.205.31.37 | 2 | 9 | 1 | 70 | 1015394479 | 1015394479 | 0 | 9765 | 0 | 16 | 1 | 0 | 6467 | 2686 | 16 | 8 | 50352481 |
| 209.12.44.46 | 32.27.0.53 | 192.205.31.37 | 2 | 9 | 1 | 66 | 1015394480 | 1015394480 | 0 | 9765 | 0 | 16 | 1 | 0 | 6467 | 2686 | 16 | 8 | 50352751 |
| 209.12.44.46 | 32.29.0.53 | 192.205.31.37 | 2 | 9 | 1 | 70 | 1015394482 | 1015394482 | 0 | 9765 | 0 | 16 | 1 | 0 | 6467 | 2686 | 16 | 8 | 50353051 |
| 209.12.44.46 | 32.31.0.53 | 192.205.31.37 | 2 | 9 | 1 | 66 | 1015394483 | 1015394483 | 0 | 9765 | 0 | 16 | 1 | 0 | 6467 | 2686 | 16 | 8 | 50353261 |
| 209.12.44.46 | 32.33.0.53 | 192.205.31.37 | 2 | 9 | 1 | 70 | 1015394485 | 1015394485 | 0 | 9765 | 0 | 16 | 1 | 0 | 6467 | 2686 | 16 | 8 | 50354101 |
| 209.12.44.46 | 32.35.0.53 | 192.205.31.37 | 2 | 9 | 1 | 66 | 1015394486 | 1015394486 | 0 | 9765 | 0 | 16 | 1 | 0 | 6467 | 2686 | 16 | 8 | 50354641 |
| 209.12.44.46 | 32.37.0.53 | 192.205.31.37 | 2 | 9 | 1 | 70 | 1015394488 | 1015394488 | 0 | 9765 | 0 | 16 | 1 | 0 | 6467 | 2686 | 16 | 8 | 50355001 |
| 209.12.44.46 | 32.39.0.53 | 192.205.31.37 | 2 | 9 | 1 | 66 | 1015394489 | 1015394489 | 0 | 9765 | 0 | 16 | 1 | 0 | 6467 | 2686 | 16 | 8 | 50354311 |
| 209.12.44.46 | 32.41.0.53 | 192.205.31.37 | 2 | 9 | 1 | 70 | 1015394491 | 1015394491 | 0 | 9765 | 0 | 16 | 1 | 0 | 6467 | 2686 | 16 | 8 | 50354851 |
| 209.12.44.46 | 32.43.0.53 | 192.205.31.37 | 2 | 9 | 1 | 66 | 1015394492 | 1015394492 | 0 | 9765 | 0 | 16 | 1 | 0 | 6467 | 2686 | 16 | 8 | 50355241 |
| 209.12.44.46 | 32.45.0.53 | 192.205.31.37 | 2 | 9 | 1 | 70 | 1015394494 | 1015394494 | 0 | 9765 | 0 | 16 | 1 | 0 | 6467 | 2686 | 16 | 8 | 50355631 |
| 209.12.44.46 | 32.47.0.53 | 192.205.31.37 | 2 | 9 | 1 | 66 | 1015394495 | 1015394495 | 0 | 9765 | 0 | 16 | 1 | 0 | 6467 | 2686 | 16 | 8 | 50355961 |
| 209.12.44.46 | 32.49.0.53 | 192.205.31.37 | 2 | 9 | 1 | 70 | 1015394497 | 1015394497 | 0 | 9765 | 0 | 16 | 1 | 0 | 6467 | 2686 | 16 | 8 | 50356231 |
| 209.12.44.46 | 32.51.0.53 | 192.205.31.37 | 2 | 9 | 1 | 66 | 1015394498 | 1015394498 | 0 | 9765 | 0 | 16 | 1 | 0 | 6467 | 2686 | 16 | 8 | 50356681 |
| 209.12.44.46 | 32.53.0.53 | 192.205.31.37 | 2 | 9 | 1 | 70 | 1015394500 | 1015394500 | 0 | 9765 | 0 | 16 | 1 | 0 | 6467 | 2686 | 16 | 8 | 50356951 |
| 209.12.44.46 | 32.55.0.53 | 192.205.31.37 | 2 | 9 | 1 | 66 | 1015394501 | 1015394501 | 0 | 9765 | 0 | 16 | 1 | 0 | 6467 | 2686 | 16 | 8 | 50357371 |
| 209.12.44.46 | 32.57.0.53 | 192.205.31.37 | 2 | 9 | 1 | 70 | 1015394503 | 1015394503 | 0 | 9765 | 0 | 16 | 1 | 0 | 6467 | 2686 | 16 | 8 | 50357731 |
| 209.12.44.46 | 32.59.0.53 | 192.205.31.37 | 2 | 9 | 1 | 66 | 1015394504 | 1015394504 | 0 | 9765 | 0 | 16 | 1 | 0 | 6467 | 2686 | 16 | 8 | 50358001 |
| 209.12.44.46 | 32.61.0.53 | 192.205.31.37 | 2 | 9 | 1 | 70 | 1015394506 | 1015394506 | 0 | 9765 | 0 | 16 | 1 | 0 | 6467 | 2686 | 16 | 8 | 50358271 |
| 209.12.44.46 | 32.63.0.53 | 192.205.31.37 | 2 | 9 | 1 | 66 | 1015394507 | 1015394507 | 0 | 9765 | 0 | 16 | 1 | 0 | 6467 | 2686 | 16 | 8 | 50358631 |
| 209.12.44.46 | 32.65.0.53 | 192.205.31.37 | 2 | 9 | 1 | 70 | 1015394509 | 1015394509 | 0 | 9765 | 0 | 16 | 1 | 0 | 6467 | 2686 | 16 | 8 | 50358841 |
| 209.12.44.46 | 32.67.0.53 | 192.205.31.37 | 2 | 9 | 1 | 66 | 1015394510 | 1015394510 | 0 | 9765 | 0 | 16 | 1 | 0 | 6467 | 2686 | 16 | 8 | 50359321 |
| 209.12.44.46 | 32.69.0.53 | 192.205.31.37 | 2 | 9 | 1 | 70 | 1015394512 | 1015394512 | 0 | 9765 | 0 | 16 | 1 | 0 | 6467 | 2686 | 16 | 8 | 50359591 |
| 209.12.44.46 | 32.71.0.53 | 192.205.31.37 | 2 | 9 | 1 | 66 | 1015394513 | 1015394513 | 0 | 9765 | 0 | 16 | 1 | 0 | 6467 | 2686 | 16 | 8 | 50360701 |
| 209.12.44.46 | 32.73.0.53 | 192.205.31.37 | 2 | 9 | 1 | 70 | 1015394515 | 1015394515 | 0 | 9765 | 0 | 16 | 1 | 0 | 6467 | 2686 | 16 | 8 | 50360161 |
| 209.12.44.46 | 32.75.0.53 | 192.205.31.37 | 2 | 9 | 1 | 66 | 1015394516 | 1015394516 | 0 | 9765 | 0 | 16 | 1 | 0 | 6467 | 2686 | 16 | 8 | 50360551 |
| 209.12.44.46 | 32.77.0.53 | 192.205.31.37 | 2 | 9 | 1 | 70 | 1015394518 | 1015394518 | 0 | 9765 | 0 | 16 | 1 | 0 | 6467 | 2686 | 16 | 8 | 50360851 |
| 209.12.44.46 | 32.79.0.53 | 192.205.31.37 | 2 | 9 | 1 | 64 | 1015394518 | 1015394518 | 0 | 9765 | 0 | 16 | 1 | 0 | 6467 | 2686 | 16 | 8 | 50360881 |
| 209.12.44.46 | 32.81.0.53 | 192.205.31.37 | 2 | 9 | 1 | 66 | 1015394519 | 1015394519 | 0 | 9765 | 0 | 16 | 1 | 0 | 6467 | 2686 | 16 | 8 | 50361301 |
| 209.12.44.46 | 32.85.0.53 | 192.205.31.37 | 2 | 9 | 1 | 70 | 1015394521 | 1015394521 | 0 | 9765 | 0 | 16 | 1 | 0 | 6467 | 2686 | 16 | 8 | 50361631 |
| 209.12.44.46 | 32.89.0.53 | 192.205.31.37 | 2 | 9 | 1 | 66 | 1015394522 | 1015394522 | 0 | 9765 | 0 | 16 | 1 | 0 | 6467 | 2686 | 16 | 8 | 50362081 |
| 209.12.44.46 | 32.91.0.53 | 192.205.31.37 | 2 | 9 | 1 | 70 | 1015394524 | 1015394524 | 0 | 9765 | 0 | 16 | 1 | 0 | 6467 | 2686 | 16 | 8 | 50362381 |
| 209.12.44.46 | 32.97.0.53 | 192.205.31.37 | 2 | 9 | 1 | 70 | 1015394528 | 1015394528 | 0 | 9765 | 0 | 16 | 1 | 0 | 6467 | 0 | 13 | 50363281 | |
| 209.12.44.46 | 32.99.0.53 | 192.205.31.37 | 2 | 9 | 1 | 66 | 1015394532 | 1015394532 | 0 | 9765 | 0 | 16 | 1 | 0 | 6467 | 0 | 13 | 50364241 | |
| 209.12.44.46 | 32.101.0.53 | 192.205.31.37 | 2 | 9 | 1 | 70 | 1015394534 | 1015394534 | 0 | 9765 | 0 | 16 | 1 | 0 | 6467 | 2693 | 16 | 24 | 50364601 |
| 209.12.44.46 | 32.103.0.53 | 192.205.31.37 | 2 | 9 | 1 | 68 | 1015394535 | 1015394535 | 0 | 9765 | 0 | 16 | 1 | 0 | 6467 | 0 | 13 | 50364931 | |
| 209.12.44.46 | 32.105.0.53 | 192.205.31.37 | 2 | 9 | 1 | 66 | 1015394535 | 1015394535 | 0 | 9765 | 0 | 16 | 1 | 0 | 6467 | 2688 | 16 | 15 | 50364991 |
| 209.12.44.46 | 32.107.0.53 | 192.205.31.37 | 2 | 9 | 1 | 70 | 1015394537 | 1015394537 | 0 | 9765 | 0 | 16 | 1 | 0 | 6467 | 2686 | 16 | 8 | 50365261 |
| 209.12.44.46 | 32.109.0.53 | 192.205.31.37 | 2 | 9 | 1 | 66 | 1015394538 | 1015394538 | 0 | 9765 | 0 | 16 | 1 | 0 | 6467 | 2686 | 16 | 8 | 50365621 |
| 209.12.44.46 | 32.111.0.53 | 192.205.31.37 | 2 | 9 | 1 | 70 | 1015394540 | 1015394540 | 0 | 9765 | 0 | 16 | 1 | 0 | 6467 | 2686 | 16 | 8 | 50365861 |
| 209.12.44.46 | 32.113.0.53 | 192.205.31.37 | 2 | 9 | 1 | 66 | 1015394541 | 1015394541 | 0 | 9765 | 0 | 16 | 1 | 0 | 6467 | 2686 | 16 | 8 | 50366191 |
| 209.12.44.46 | 32.115.0.53 | 192.205.31.37 | 2 | 9 | 1 | 70 | 1015394543 | 1015394543 | 0 | 9765 | 0 | 16 | 1 | 0 | 6467 | 2686 | 16 | 8 | 50366491 |
| 209.12.44.46 | 32.117.0.53 | 192.205.31.37 | 2 | 9 | 1 | 66 | 1015394544 | 1015394544 | 0 | 9765 | 0 | 16 | 1 | 0 | 6467 | 2686 | 16 | 8 | 50366791 |
| 209.12.44.46 | 32.119.0.53 | 192.205.31.37 | 2 | 9 | 1 | 70 | 1015394546 | 1015394546 | 0 | 9765 | 0 | 16 | 1 | 0 | 6467 | 2686 | 16 | 8 | 50367061 |
| 209.12.44.46 | 32.121.0.53 | 192.205.31.37 | 2 | 9 | 1 | 66 | 1015394547 | 1015394547 | 0 | 9765 | 0 | 16 | 1 | 0 | 6467 | 2686 | 16 | 8 | 50367841 |
| 209.12.44.46 | 32.123.0.53 | 192.205.31.37 | 2 | 9 | 1 | 70 | 1015394549 | 1015394549 | 0 | 9765 | 0 | 16 | 1 | 0 | 6467 | 2686 | 16 | 8 | 50367571 |
| 209.12.44.46 | 32.125.0.53 | 192.205.31.37 | 2 | 9 | 1 | 66 | 1015394551 | 1015394551 | 0 | 9765 | 0 | 16 | 1 | 0 | 6467 | 2686 | 16 | 8 | 50368621 |
| 209.12.44.46 | 32.127.0.53 | 192.205.31.37 | 2 | 9 | 1 | 70 | 1015394552 | 1015394552 | 0 | 9765 | 0 | 16 | 1 | 0 | 6467 | 2686 | 16 | 8 | 50367931 |
| 209.12.44.46 | 32.129.0.53 | 192.205.31.37 | 2 | 9 | 1 | 66 | 1015394554 | 1015394554 | 0 | 9765 | 0 | 16 | 1 | 0 | 6467 | 2686 | 16 | 8 | 50368471 |
| 209.12.44.46 | 32.131.0.53 | 192.205.31.37 | 2 | 9 | 1 | 70 | 1015394555 | 1015394555 | 0 | 9765 | 0 | 16 | 1 | 0 | 6467 | 2686 | 16 | 8 | 50368921 |
| 209.12.44.46 | 32.133.0.53 | 192.205.31.37 | 2 | 9 | 1 | 66 | 1015394557 | 1015394557 | 0 | 9765 | 0 | 16 | 1 | 0 | 6467 | 2686 | 16 | 8 | 50369491 |
| 209.12.44.46 | 32.135.0.53 | 192.205.31.37 | 2 | 9 | 1 | 70 | 1015394558 | 1015394558 | 0 | 9765 | 0 | 16 | 1 | 0 | 6467 | 2686 | 16 | 8 | 50369761 |
| 209.12.44.46 | 32.137.0.53 | 192.205.31.37 | 2 | 9 | 1 | 66 | 1015394560 | 1015394560 | 0 | 9765 | 0 | 16 | 1 | 0 | 6467 | 2686 | 16 | 8 | 50370121 |
| 209.12.44.46 | 32.139.0.53 | 192.205.31.37 | 2 | 9 | 1 | 70 | 1015394561 | 1015394561 | 0 | 9765 | 0 | 16 | 1 | 0 | 6467 | 2686 | 16 | 8 | 50370451 |
| 209.12.44.46 | 32.141.0.53 | 192.205.31.37 | 2 | 9 | 1 | 66 | 1015394563 | 1015394563 | 0 | 9765 | 0 | 16 | 1 | 0 | 6467 | 2686 | 16 | 8 | 50370811 |
| 209.12.44.46 | 32.143.0.53 | 192.205.31.37 | 2 | 9 | 1 | 70 | 1015394564 | 1015394564 | 0 | 9765 | 0 | 16 | 1 | 0 | 6467 | 2686 | 16 | 8 | 50371051 |
| 209.12.44.46 | 32.145.0.53 | 192.205.31.37 | 2 | 9 | 1 | 66 | 1015394566 | 1015394566 | 0 | 9765 | 0 | 16 | 1 | 0 | 6467 | 2686 | 16 | 8 | 50371471 |
| 209.12.44.46 | 32.147.0.53 | 192.205.31.37 | 2 | 9 | 1 | 70 | 1015394567 | 1015394567 | 0 | 9765 | 0 | 16 | 1 | 0 | 6467 | 2686 | 16 | 8 | 50371741 |
| 209.12.44.46 | 32.149.0.53 | 192.205.31.37 | 2 | 9 | 1 | 66 | 1015394569 | 1015394569 | 0 | 9765 | 0 | 16 | 1 | 0 | 6467 | 2686 | 16 | 8 | 50372041 |
| 209.12.44.46 | 32.151.0.53 | 192.205.31.37 | 2 | 9 | 1 | 70 | 1015394570 | 1015394570 | 0 | 9765 | 0 | 16 | 1 | 0 | 6467 | 2686 | 16 | 8 | 50372341 |
| 209.12.44.46 | 32.153.0.53 | 192.205.31.37 | 2 | 9 | 1 | 66 | 1015394572 | 1015394572 | 0 | 9765 | 0 | 16 | 1 | 0 | 6467 | 2686 | 16 | 8 | 50372671 |

SYSTEM AND METHOD FOR MONITORING NETWORK ACTIVITY

BACKGROUND

Computer networks, such as those utilizing the Internet Protocol ("IP") are subject to security violations. These security violations can include activities such as reconnaissance, exploits, denial of service ("DoS"), and misuse of the network. In the case of exploits, DoS attacks, and misuse, the security violations are often only detected after the security violations have begun. By the time the security violations are detected, damage (e.g., slowed traffic, corrupted data, stolen data, etc.) may have already occurred.

It is desirable, therefore, to detect security violations as early as possible. One method of doing this is to detect reconnaissance (i.e., scanning) attacks, which are often a precursor to the other types of security violations. By detecting the scanning attacks, the other types of security violations are anticipated, and preventative measures may be taken. Accordingly, there is a need for a method of detecting the scanning attacks reliably and accurately.

SUMMARY OF THE INVENTION

A method for receiving first data corresponding to usage of a network, receiving second data corresponding to usage of the network, comparing the first data to the second data and providing an indication of a network event when the second data varies from the second data greater than a predetermined threshold.

A system having a data collection module to receive first data corresponding to usage of a network, a data collection module to receive second data corresponding to usage of the network, a comparison module to compare the first data and the second data and an output module to provide an indication of a network event when the second data varies from the first data greater than a predetermined threshold.

A computer system comprising a memory for storing a set of instructions and a processor for executing the set of instructions. The set of instructions being operable to receive first data corresponding to usage of a network, receive second data corresponding to usage of the network, compare the first data and the second data and provide an indication of a network event when the second data varies from the first data greater than a predetermined threshold.

BRIEF DESCRIPTION OF DRAWINGS

FIG. 15 shows an exemplary embodiment of a data record according to the present invention.

DETAILED DESCRIPTION

Figures 1, 2:
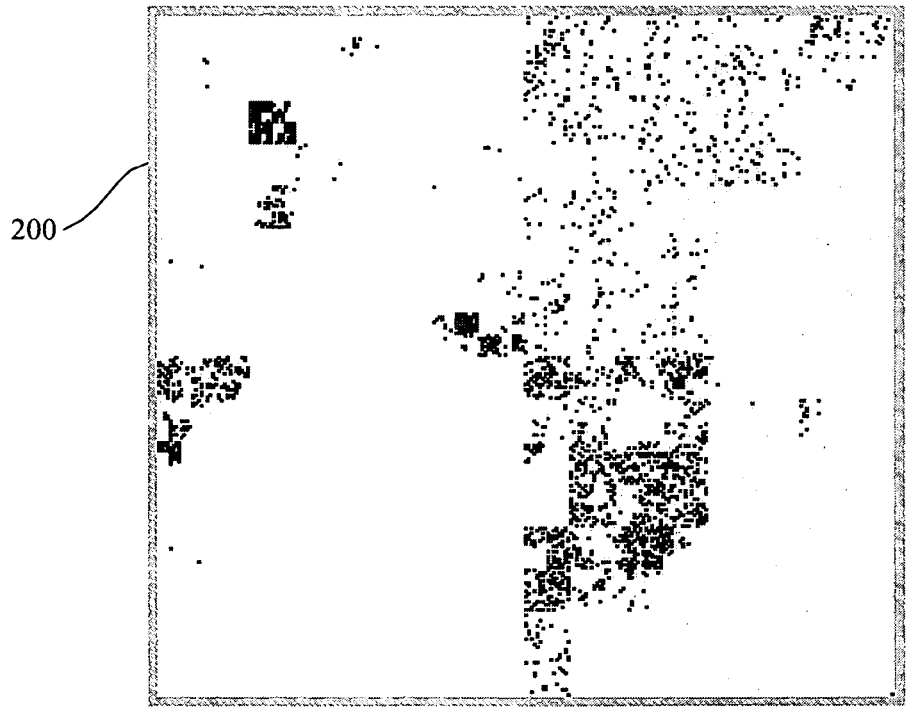
FIG. 1 shows an exemplary embodiment of a grid corresponding to a network graph according to the present invention.
FIG. 2 shows an exemplary embodiment of an IP address usage graph according to the present invention.

The present invention may be further understood with reference to the following description and the appended drawings, wherein like elements are referred to with the same reference numerals. The exemplary embodiment of the present invention describes a method for monitoring network activity and detecting scanning activity within a network. A method for visualizing network activity will be described below, followed by a discussion of exemplary methods for detecting scanning activity.

The methods described herein may be performed, either partially or entirely on one or more computing devices. The computing device(s) may include components such as a processor (e.g., a microprocessor, an application-specific integrated circuit ("ASIC"), etc.) for executing instructions, a memory (e.g., a hard drive, a random-access memory ('RAM"), etc.) for storing the instructions and data, an input device (e.g., a keyboard, a mouse, etc.), an output device (e.g., a monitor), and a network communications arrangement (e.g., a network interface card, a wireless adapter, etc.).

In the exemplary embodiment, a method for visualizing network activity utilizes NetFlow data. However, those skilled in the art will understand that other types of data may also be utilized for visualizing network activity. NetFlow refers to a technology and applications utilizing this technology, which are available from Cisco Systems, Inc. NetFlow allows measurements to be made for applications such as network traffic accounting and network monitoring. As would be known to one skilled in the art, scanning activities are often used by would-be assailants of the network to identify network topology, operating systems, and/or network services running on potential target systems residing in the network. By observing Netflow data traversing the routers in the network, it is possible to detect scanning activity and thus anticipate other security violations. It is also possible to detect Internet Protocol ("IP") address spoofing using NetFlow data.

After Netflow data has been acquired, it is necessary to organize the NetFlow data in a manner that is conducive to the detection of scanning activity. One method of organizing the NetFlow data is to use IP Graph. IP Graph is software developed by AT&T Corp. ("AT&T") to graphically represent IP addresses. IP Graph utilizes a two-dimensional grid 100 of coordinate values corresponding to a network graph, as illustrated in an exemplary embodiment shown in FIG. 1. In the exemplary embodiment, the grid 100 is a 16 by 16 square formed by blocks numbered from 0 to 255. Each block may be used to represent part or all of an IP address whose 32 bits are denoted as A.B.C.D. Because there are 256 blocks, it is possible to represent the first 8 bits of the IP address (denoted by the letter, "A") by marking the block whose number matches the numerical value of the first 8 bits. For example, if the first 8 bits of the IP address are 11111111 (255 in base ten) the block number 255 may be marked (e.g., colored or highlighted) to indicate this. The next 8 bits of the IP address (denoted by the letter, "B") may also be represented by dividing each of the 256 A blocks into 256 smaller B blocks. For example, if B is 11111111, then A.B may be represented by marking a B block number 255, which is located in the lower right-hand corner of the A block number 255.

In the exemplary embodiment of the grid 100, only the first 16 bits of the IP address (i.e., A.B) are represented. However, in other embodiments, additional bits of the IP address may be represented through further subdivision of the grid 100, changing the dimensions of the grid 100, etc. In addition, the grid 100 may be used to display other information. For example, a third dimension may be used to represent traffic volume (e.g., the number of flows, packets, bytes, etc.) for each IP address. The number and size of the dimensions of the grid 100 may therefore be customized to a user's specification as well as for compatibility with hardware on which IP Graph is run (e.g., sizing the grid 100 so that the total number of blocks is less than or equal to a maximum number of pixels a video monitor is capable of displaying).

FIG. 2 shows an exemplary embodiment of an IP address usage graph 200, which illustrates the number of unique 16-bit portions of destination IP addresses observed from NetFlow data during a predetermined time interval (e.g., 10 minutes). By examining changes to network graphs over various time intervals, scanning activity can be detected. For example, if a subsequent network graph were to show a significant increase in the number of destination IP addresses, this may indicate that scanning activity has occurred. Exemplary methods of detecting scanning activity using network graphs will be described in detail below.

Figure 3:
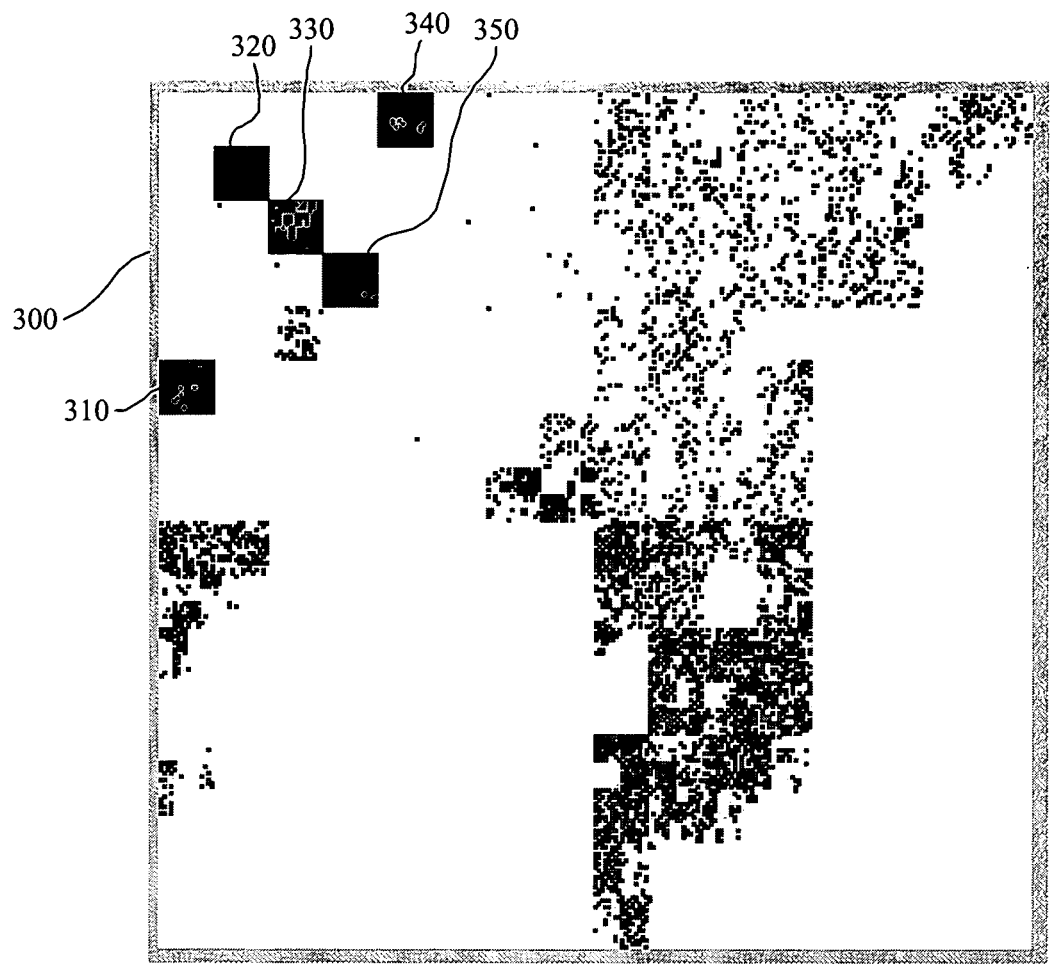
FIG. 3 shows an exemplary embodiment of another IP address usage graph according to the present invention.

FIG. 3 shows an exemplary embodiment of a network graph 300, which illustrates the number of unique 16-bit portions of destination IP addresses announced by AT&T's Internet Gateway Routers ("IGRs") belonging to the network. As would be known to one skilled in the art, the destination IP addresses depicted in the network graph 300 include addresses that are owned and/or managed by an owner of the network. For example, the network graph 300 shows several blocks 310, 320, 330, 340 and 350, which are substantially filled-in, indicating that the blocks 310-350 represent large blocks of destination IP addresses owned or managed by AT&T. It will be appreciated that with this ownership information, the task of monitoring the network may be greatly simplified by focusing only on those areas of the network graph 300 which are owned and/or managed by the network provider. Thus, in analyzing network graphs generated from NetFlow data, it may be preferable to ignore blocks that do not belong to the owner. In addition to simplifying network monitoring, the network graph 300 also defines disallowed space. That is, destination IP addresses outside of the ones represented in the network graph 300 may indicate routing and/or security problems.

Figure 4:
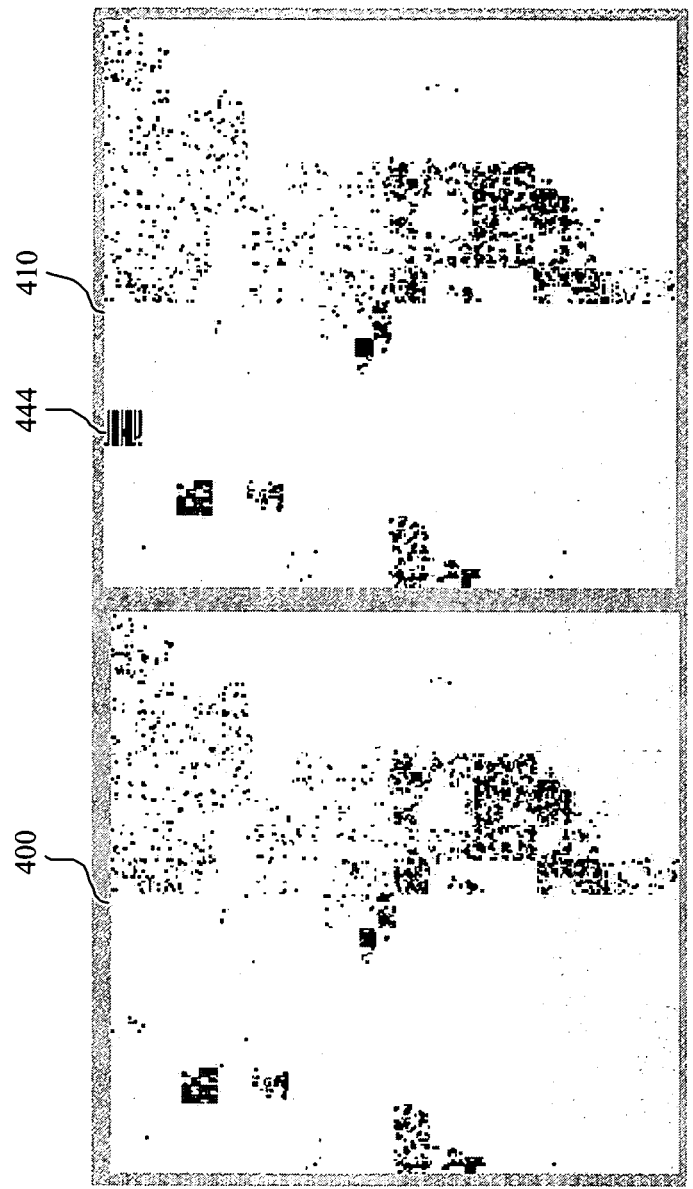
FIG. 4A shows an exemplary embodiment of an IP address usage graph before scanning activity is recorded according to the present invention.
FIG. 4B shows an exemplary embodiment of the IP address usage graph of FIG. 4A after scanning activity is recorded according to the present invention.

FIG. 4A shows an exemplary embodiment of a network graph 400 before scanning activity is recorded. The network graph 400 may represent the network at any point in time. If additional network graphs were recorded prior to the network graph 400, a comparison between the network graph 400 and the previous network graphs may be made using a method according to the present invention (which will be described below) to confirm that no scanning activity has occurred.

FIG. 4B shows an exemplary embodiment of a network graph 410 after scanning activity is recorded. The network graph 410 was recorded during a time interval following that of the network graph 400. For example, the network graph 410 may have been recorded ten minutes after the network graph 400. Thus, in the ten minutes that elapsed between the graphs 400, 410, scanning activity occurred over the network. The scanning activity is represented by a block 444, which is substantially filled-in, indicating that most of the destination IP addresses of the block 444 have been targeted. Referring to FIG. 1, it may be seen that the block 444 corresponds to the A block number 32 (00100000 in base two). Therefore, most of the destination IP addresses with A equal to 00100000 were targeted.

From the example discussed above with reference to FIGS. 4A-B, it has been demonstrated that visual inspection of the network graphs 400, 410 may be sufficient to identify scanning activity. However, visual inspection may not always be feasible. For example, in a large network with hundreds of routers and thousands of links, visual inspection of even a single network graph is tedious and difficult. The task of visual inspection is made even more onerous when a system administrator or other user must compare multiple network graphs across different time intervals. Accordingly, the present invention is directed towards providing a method of detecting scanning activity without requiring visual inspection. Two such exemplary methods will now be described in conjunction with FIGS. 5-13.

Figure 5:
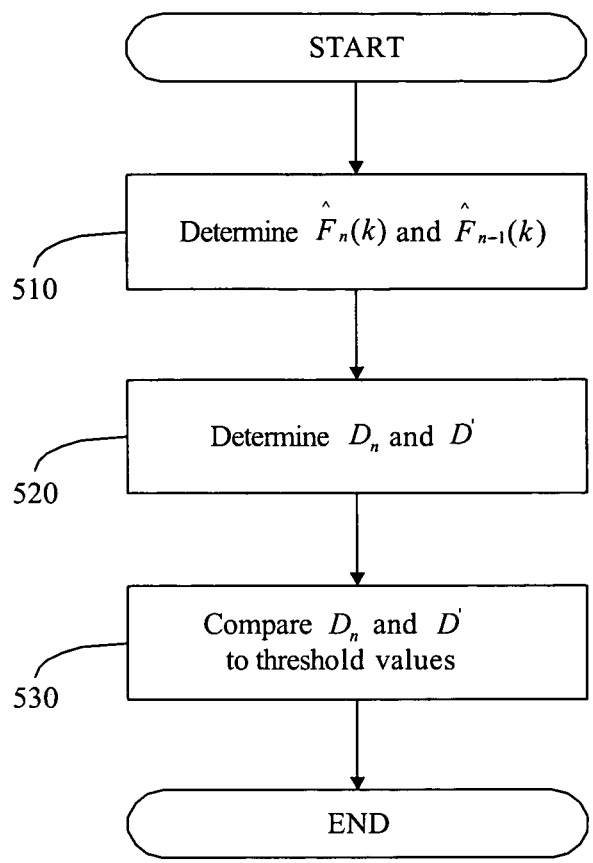
FIG. 5 shows an exemplary embodiment of a method according to the present invention.

FIG. 5 shows an exemplary embodiment of a method 500 for detecting scanning activity using the Kolmogorov-Smirnov ("K-S") test. As known to those skilled in the art of statistics, the K-S test may be used to determine if two datasets differ significantly. For example, the K-S test may be used to perform a goodness-of-fit test between an empirical distribution function, $F(x)$ and a hypothesized distribution function, $F_0(x)$. A null hypothesis, $H_0$ is selected such that $F(x)=F_0(x)$ for all x against an alternative hypothesis, $H_1$ such that $F(x) \neq F_0(x)$ for some x. In step 510, empirical and hypothesized distribution functions, $\hat{F}_n(k)$ and $\hat{F}_{n-1}(k)$ are determined from data recorded during an nth and an (n−1)th time interval, respectively. The (n−1)th time interval may correspond to that of an earlier network graph (e.g., network graph 400), while the nth time interval may correspond to a later network graph (e.g., network graph 410). Accordingly, the null hypothesis, $H_0$ is $\hat{F}_n(k) = \hat{F}_{n-1}(k)$ for all k, and the alternative hypothesis, $H_1$ is $\hat{F}_n(k) \neq \hat{F}_{n-1}(k)$ for some k. The distribution functions $\hat{F}_n(k)$ and $\hat{F}_{n-1}(k)$ may be determined according to the formula $$\hat{F}(k) = \frac{\sum_{j=0}^{k} I_j}{\sum_{j=0}^{255} I_j}, \ 0 \leq k \leq 255. \ I_j$$

is a numerical value corresponding to the number of unique Bs in a recorded sample where A equals j. (A and B represent the first and second set of eight bits, respectively, in a 32-bit IP address). Thus, the distribution functions $\hat{F}_n(k)$ and $\hat{F}_{n-1}(k)$ represent the sum of the number of unique Bs for each A up to j as a fraction of the total number of unique Bs for all As.

In step 520, two statistics, $D_n$ and $D'$ are determined according to the formulas $$D_n = \max_{k \in (0,255)} |\hat{F}_n(k) - \hat{F}_{n-1}(k)| \text{ and } D' = \sum_{k=0}^{255} |\hat{F}_k - \hat{G}_k|.$$

represents the maximum difference between the distribution functions $\hat{F}_n(k)$ and $\hat{F}_{n-1}(k)$ at corresponding values of k, and $D'$ represents the sum of the absolute differences between the two distribution functions $\hat{F}_n(k)$ and $\hat{F}_{n-1}(k)$. $D_n$ may be used to identify increases in the number of prefixes within a given A block and is effective in detecting scans which target individual A blocks, whereas $D'$ is useful for detecting scans which target multiple A blocks. It should be noted that the distribution functions shown for $D_n$ and $D'$ are the same, even though the notation is shown differently.

Figure 6:
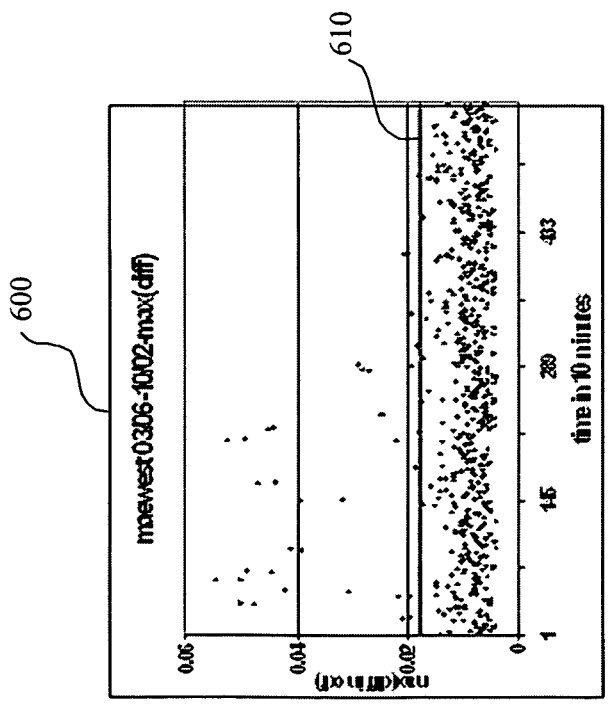
FIG. 6 shows an exemplary embodiment of a graph of a first statistic, which shows potential scanning activity according to the present invention.

In step 530, $D_n$ and $D'$ are compared to threshold values in order to detect scanning activity. The threshold values may be determined based on empirical data. For example, the threshold values may be a moving average values of $D_n$ and $D'$ observed under normal conditions for some interval, plus some standard deviations. If the threshold values are exceeded, this may indicate that scanning activity has occurred. Referring to FIG. 6, an exemplary data graph 600 shows $D_n$ plotted over various time intervals. A threshold value 610 is shown as a line and is determined from empirical data. For example, the threshold value 610 may be determined by adding 3.5 times the standard deviation to an average $D'$ value, which is calculated from a set of time intervals that are relatively free of scanning activity. A majority of the data points are below the threshold value 610, however there are also a substantial number of data points above the threshold value 610. These latter data points are referred to as outliers, and indicate that scanning activity may have occurred.

Figure 7:
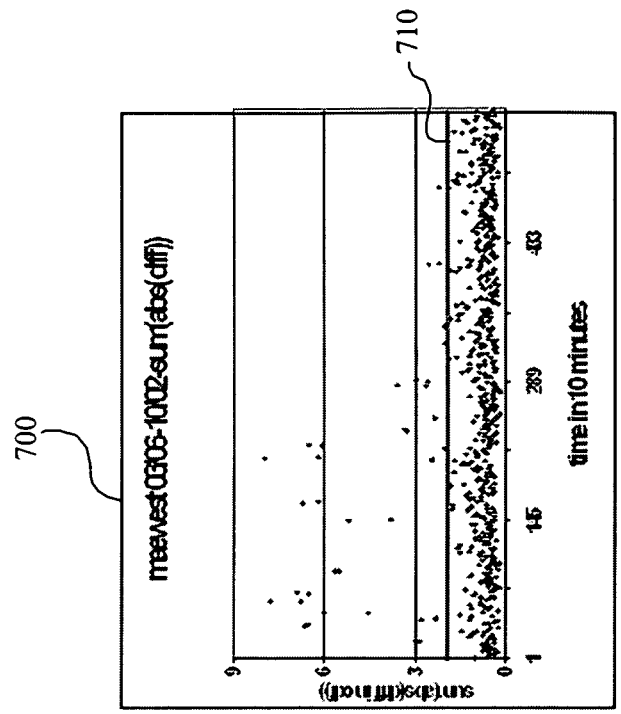
FIG. 7 shows an exemplary embodiment of a graph of a second statistic, which shows potential scanning activity according to the present invention.
Figure 9:
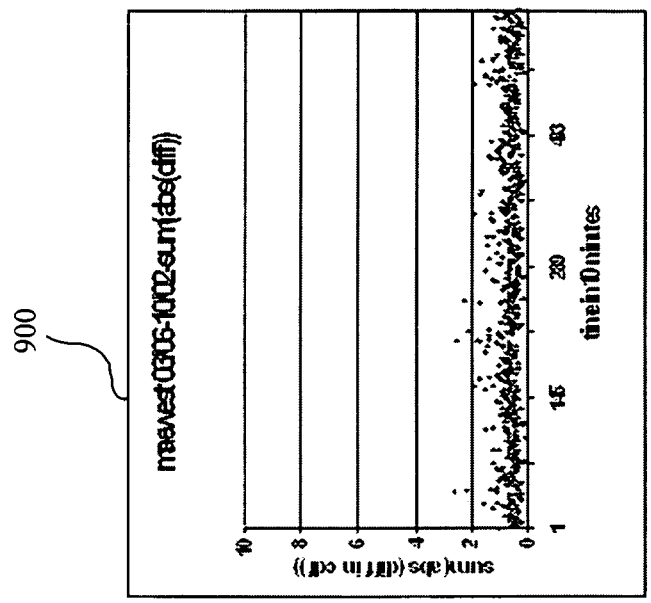
FIG. 9 shows an exemplary embodiment of a graph of the second statistic, which does not show scanning activity according to the present invention.
Figure 8:
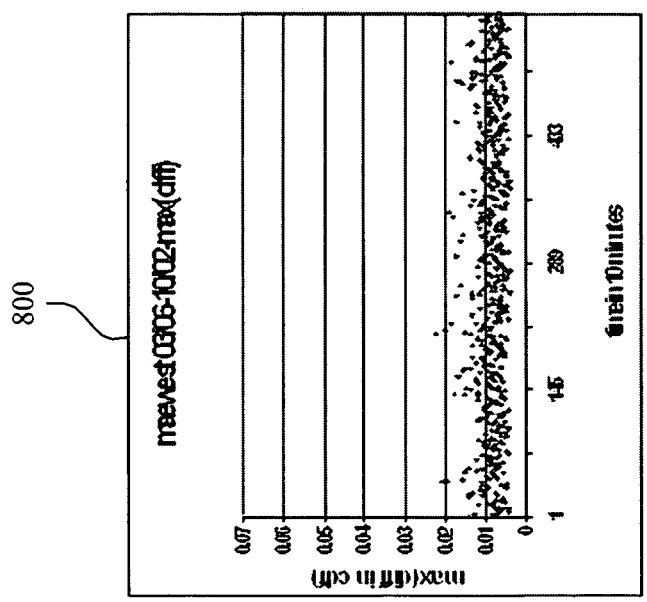
FIG. 8 shows an exemplary embodiment of a graph of the first statistic, which does not show scanning activity according to the present invention.

Similarly, an exemplary data graph 700 is shown in FIG. 7, which plots $D'$ over various time intervals and includes a threshold value 710. The threshold value 710 may be determined in a manner similar to that of the threshold 710. As evidenced by the appearance of outliers, the data graph 700 corroborates the results of the data graph 600. FIGS. 8 and 9 show exemplary embodiments of data graphs 800 and 900, which plot $D_n$ and $D'$, respectively, when excluding the block that was scanned. In contrast to the data graphs 600 and 700, few or no data points are above the threshold values 610, 710.

In the exemplary embodiment of the method 500, only the A.B portion of the destination IP address was used. However, in other embodiments it may be possible to perform the method 500 using additional portions of the destination IP address. How much of the destination IP address is used may depend on, among other things, the size/dimensions of the grid 100. In addition, it may also be possible to perform the method 500 multiple times on different portions of the destination IP address. For example, the user may initially wish to use only the A.B portion. If potential scanning activity was detected after doing so, the user may then wish to repeat the method 500 using the A.B.C portion in order to analyze the potential scanning activity in more detail and determine if specific prefixes within a C block are being targeted.

Figure 10:
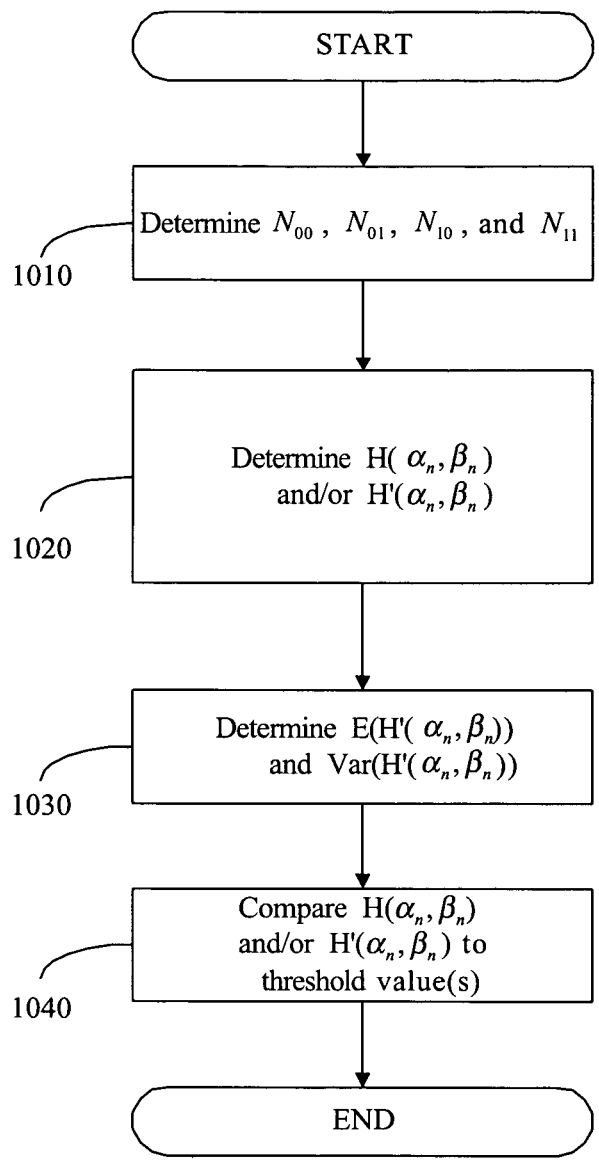
FIG. 10 shows an exemplary embodiment of another method according to the present invention.

FIG. 10 shows an exemplary embodiment of a method 1000 for detecting scanning activity using an entropy test. Unlike the K-S test using the $D_n$ and $D'$ statistics, the entropy test is not based on a cumulative distribution, and is therefore effective in detecting sudden increases in the number of prefixes over a time interval. However, one drawback to the entropy test is that it does not provide any information regarding which blocks are being targeted. Therefore, it may be desirable, but not required, to use both the methods 500, 1000 to detect scanning activity. As with the method 500, the method 1000 will be described with reference to the A.B portion of the destination IP address. However, other embodiments may use other portions of the destination IP address. In step 1010, four entropy factors, $N_{00}$, $N_{01}$, $N_{10}$ and $N_{11}$ are determined. Given two sets of destination IP addresses, where the second of the two sets is recorded after the first set, such as in the network graphs 400,410, $N_{00}$ is the number of unique A.Bs that appear in both sets, $N_{01}$ is the number of unique A.Bs in the first set, but not the second, $N_{10}$ is the number of unique A.Bs that appear in the second set, but not the first, and $N_{11}$ is the number of unique A.Bs that do not appear in either set.

In step 1020, an entropy, H is determined where $$H = -\frac{\ln\left(\left(\frac{N_{00}}{N_{00}+N_{01}}\right)^{N_{00}}\left(\frac{N_{01}}{N_{00}+N_{01}}\right)^{N_{01}}\left(\frac{N_{10}}{N_{10}+N_{11}}\right)^{N_{01}}\left(\frac{N_{11}}{N_{10}+N_{11}}\right)^{N_{11}}\right)}{N_{00}+N_{01}+N_{10}+N_{11}}$$

$$= -\frac{N_{00}\ln\frac{N_{00}}{N_{00}+N_{01}} + N_{01}\ln\frac{N_{01}}{N_{00}+N_{01}} + N_{10}\ln\frac{N_{10}}{N_{10}+N_{11}} + N_{11}\ln\frac{N_{11}}{N_{10}+N_{11}}}{N_{00}+N_{01}+N_{10}+N_{11}}.$$

The entropy H indicates the difference between the two sets. When the sets are identical, H equals zero. As the difference between the two sets increases (indicating possible scanning activity), the entropy H correspondingly increases.

It may also be desirable to determine whether the sets are different using a steady-state entropy in addition to, or instead of, the entropy H. Accordingly, two transition probabilities, $\alpha$ and $\beta$ are determined along with a steady-state entropy, H'. $\alpha$ represents the probability of remaining in the second set during the next time interval, and $\beta$ represents the probability of remaining out of the second set during the next time interval. These transition probabilities are determined according to the formulas $$\alpha = \frac{N_{00}}{N_{00}+N_{01}}, \beta = \frac{N_{11}}{N_{10}+N_{11}}.$$

The steady-state entropy H' is a function of $\alpha$ and $\beta$, and is determined according to the formula $$H'(\alpha, \beta) = -\frac{(1-\beta)(\alpha\ln\alpha + (1-\alpha)\ln(1-\alpha)) + (1-\alpha)(\beta\ln\beta + (1-\beta)\ln(1-\beta))}{2-\alpha-\beta}.$$

In order to simplify computations, the steady-state entropy H' may be approximated using smoothed values of $\alpha$ and $\beta$, which are obtained after applying exponential smoothing with a smoothing constant, w where 0<w<1. The smoothed values, which are denoted by the symbols $\hat{\alpha}_n, \hat{\beta}_n$, correspond to $\alpha$ and $\beta$ when evaluated at an nth time interval and may be determined according to the formulas $\hat{\alpha}_n = w\alpha_{n-1} + (1+w)\hat{\alpha}_{n-1}$, $\hat{\beta}_n = w\beta_{n-1} + (1-w)\hat{\beta}_{n-1}$ where $$\alpha_{n-1} = \frac{N_{00}^{n-1}}{N_{00}^{n-1} + N_{01}^{n-1}}, \beta_{n-1} = \frac{N_{11}^{n-1}}{N_{10}^{n-1} + N_{11}^{n-1}}.$$

Having determined the smoothed values $\hat{\alpha}_n$, $\hat{\beta}_n$, it is now possible to approximate H' according to the formula $$H'(\alpha, \beta) \approx H'(\hat{\alpha}, \hat{\beta}) + \frac{\partial H'(\alpha, \beta)}{\partial \alpha}\bigg|_{\alpha=\hat{\alpha}}(\alpha - \hat{\alpha}) + \frac{\partial H'(\alpha, \beta)}{\partial \beta}\bigg|_{\beta=\hat{\beta}}(\beta - \hat{\beta}).$$

In step 1030, a mean, E and a variance, Var of the entropy H are determined according to the formulas $$\text{var}(\alpha) = \frac{\hat{\alpha}(1-\hat{\alpha})}{N_{00} + N_{01}}, \text{var}(\beta) = \frac{\hat{\beta}(1-\hat{\beta})}{N_{10} + N_{11}}, E(H'(\alpha, \beta)) \approx$$

$$H'(\hat{\alpha}, \hat{\beta}), \frac{\partial H'(\alpha, \beta)}{\partial \alpha} =$$

$$-\frac{(1-\beta)(\ln\alpha + \ln(1-\alpha)) - (\beta\ln\beta + (1-\beta)\ln(1-\beta))}{2-\alpha-\beta} -$$

$$\frac{(1-\beta)(\alpha\ln\alpha + (1-\alpha)\ln(1-\alpha)) + (1-\alpha)(\beta\ln\beta + (1-\beta)\ln(1-\beta))}{(2-\alpha-\beta)^2},$$

$$\frac{\partial H'(\alpha, \beta)}{\partial \beta} = -\frac{(1-\alpha)(\ln\beta + \ln(1-\beta)) - (\alpha\ln\alpha + (1-\alpha)\ln(1-\alpha))}{2-\alpha-\beta} -$$

$$\frac{(1-\beta)(\alpha\ln\alpha + (1-\alpha)\ln(1-\alpha)) + (1-\alpha)(\beta\ln\beta + (1-\beta)\ln(1-\beta))}{(2-\alpha-\beta)^2},$$

$$\text{and } \text{Var}(H'(\alpha, \beta)) \approx \left(\frac{\partial H'(\alpha, \beta)}{\partial \alpha}\bigg|_{\alpha=\hat{\alpha}}\right)^2$$

$$\text{var}(\alpha) + \left(\frac{\partial H'(\alpha, \beta)}{\partial \beta}\bigg|_{\beta=\hat{\beta}}\right)^2 \text{var}(\beta).$$

The mean E and the variance Var are used to determine a threshold value for the steady-state entropy H' at the nth time interval. The threshold value for the steady-state entropy H' is determined according to the formula $$E(H'(\alpha, \beta)) + 3.5\sqrt{\text{var}(H'(\alpha, \beta))}.$$

A threshold value for the entropy H may also be determined using empirical data.

Figure 12:
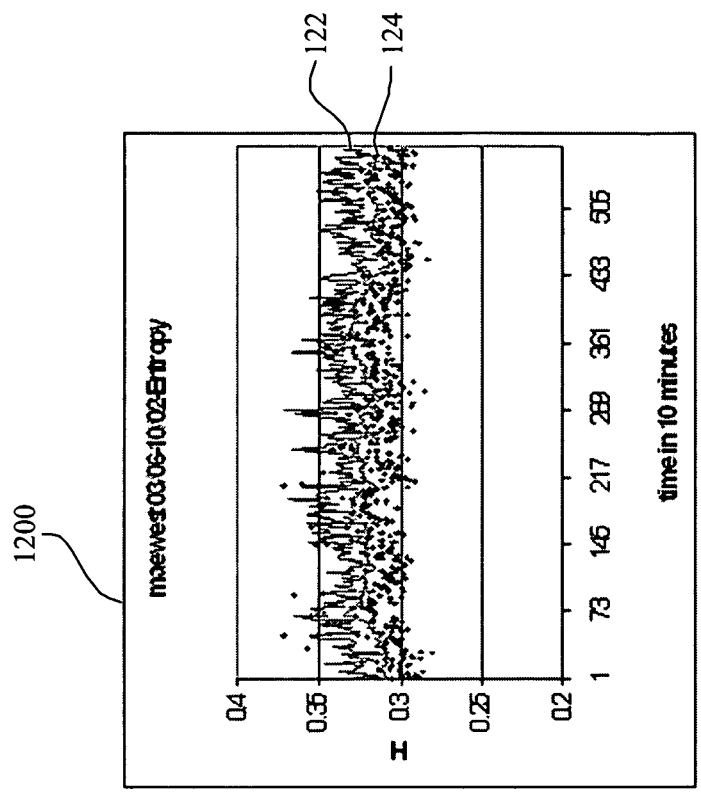
FIG. 12 shows an exemplary embodiment of a graph of a fourth statistic, which shows potential scanning activity according to the present invention.
Figure 11:
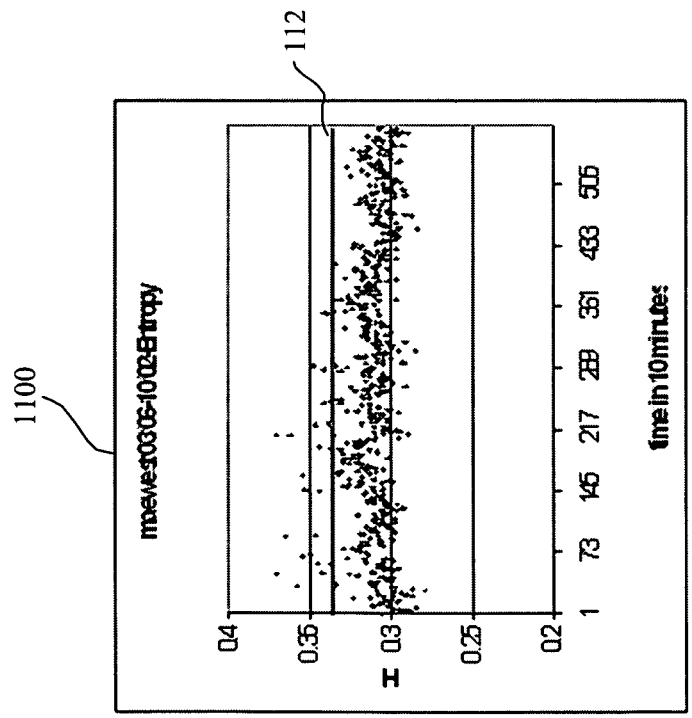
FIG. 11 shows an exemplary embodiment of a graph of a third statistic, which shows potential scanning activity according to the present invention.
Figure 13:
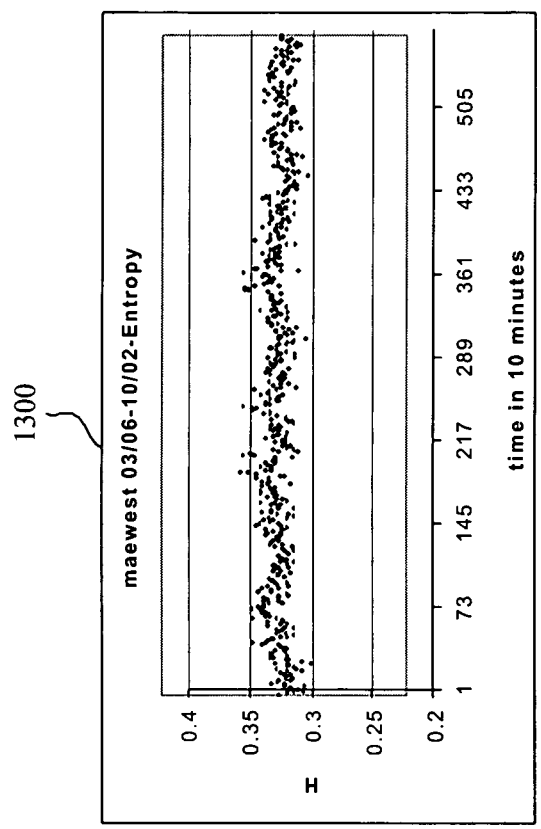
FIG. 13 shows an exemplary embodiment of a graph of the third statistic, which does not show scanning activity according to the present invention.

In step 1040, the entropy H and/or the steady-state entropy H' are compared to their respective threshold values. If the respective threshold values are exceeded, this may indicate that scanning activity has occurred. Referring to FIG. 11, an exemplary data graph 1100 shows the entropy H plotted over various time intervals. As seen from the outliers above a threshold value 112, scanning activity may have occurred. The threshold value 112 may be determined in a manner similar to that of the threshold value 610 (e.g., an average value plus 3.5 times a standard deviation). A similar data graph is shown in FIG. 12, which shows an exemplary data graph 1200 plotting the steady-state entropy H'. The data graph 1200 shows two threshold lines 122 and 124, which are calculated using w values of 0.8 and 0.2, respectively. When w is close to 1, as is the case with the threshold line 122, the threshold line has a tendency to follow the original data. When w is close to 0, as is the case with the threshold line 124, the threshold line is smoother and does not follow the original data as closely. As can be seen, using the threshold line 122 results in fewer outliers. FIG. 13 shows an exemplary data graph 1300 which plots the entropy H over various data values. In contrast to the data graph 1100, few or none of the data points are above the threshold value 112, indicating that scanning activity has not occurred.

Figure 14:
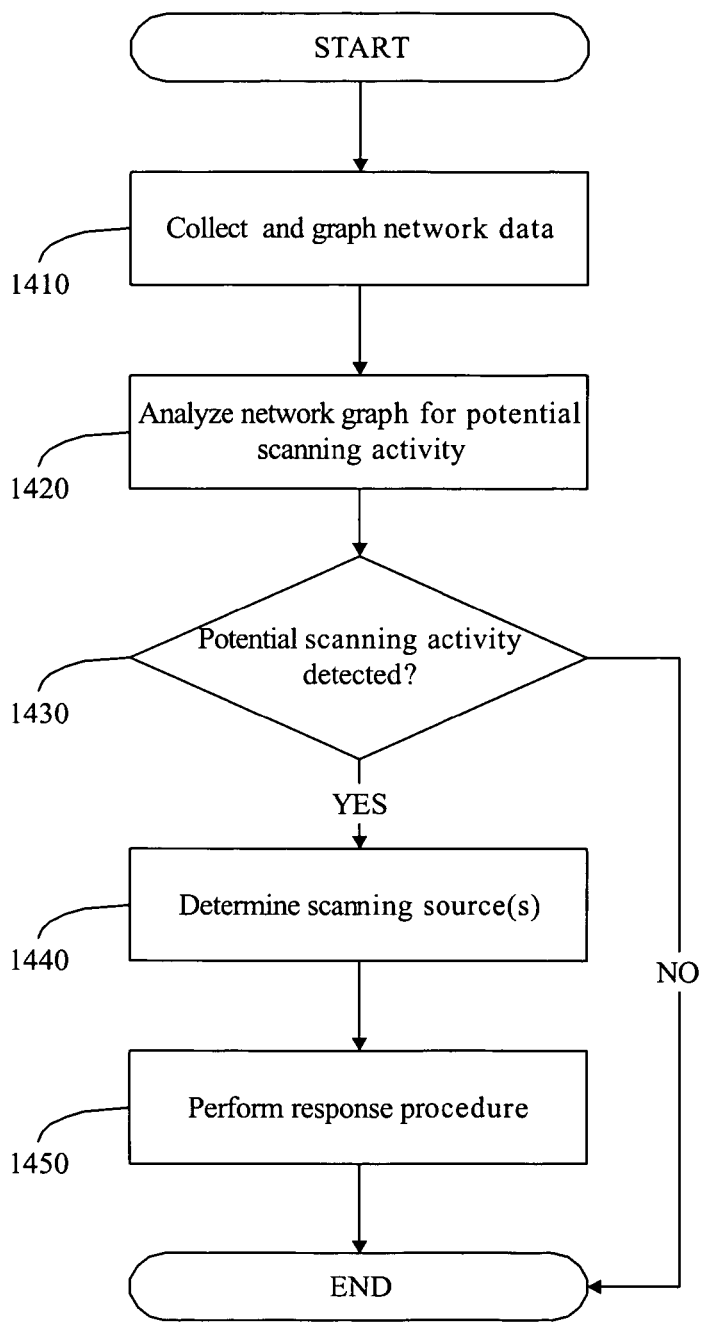
FIG. 14 shows an exemplary embodiment of yet another method according to the present invention.

FIG. 14 shows an exemplary embodiment of a method 1400 for monitoring network activity. The method 1400 may be performed automatically at scheduled intervals, or at the request of the user. In step 1410, network data (e.g., NetFlow data) is collected and graphed. The collection and/or graphing of the network data may be performed whenever the method 1400 is initiated, or the network data could be retrieved from a database which is continually updated with new network data. This may be performed using IP graph as discussed above. NetFlow data is retrieved from routers in the network, and destination IP addresses are plotted on a network graph. Although not necessary for the detection of scanning activity, the graphing of the network data allows the user to visualize traffic rather than relying solely on the output of a scanning activity analysis. Graphing the network data also facilitates the detection of trends in and/or substantial changes to the network activity.

In step 1420, the network graph is analyzed for potential scanning activity. Data points on the network graph may be analyzed, for example, using one or both of the methods 500, 1000. For example, the user may choose to monitor for scanning activity using the method 500 and then confirm the results of the method 500 by performing the method 1000 or a visual inspection. Data graphs of the $D_n$ and D' statistics and/or the entropy H and/or the steady-state entropy H' may be generated depending on which method(s) are used to analyze the network graph. Accordingly, in step 1430, a determination is made as to whether potential scanning activity has been detected.

In step 1440, if potential scanning activity was detected, the source(s) of the potential scanning activity are determined. This may be done by first locating the time intervals at which outliers are located. For example, in FIG. 6, the k values for each outlier may be used to locate the block(s) targeted by the outlier. This may be done for all the time intervals at once, or the time intervals may be split and evaluated separately. In the exemplary embodiment of the data graph 600, splitting the time intervals and evaluating only the first 1440 minutes (i.e., one day) yields 7 groups of outliers beginning at the $20^{th}$ 10-minute interval and whose k values indicate that the block number 32 was targeted. Each outlier group consists of two outliers, which are followed by a period of normal activity. Having identified the target block, NetFlow data may then be used to reveal additional information. FIG. 15 shows an exemplary data record 1500, which lists NetFlow records for the time intervals corresponding to the data graph 600. For brevity, only the records for the $20^{th}$ 10-minute interval are shown. These records indicate that for the first scan, a single Ping packet was sent to every other address in the second (i.e., B) portion of the destination IP addresses with the form 32.x.0.53. The sizes of the Ping packets varied from 66 to 70 bytes, and the average time between scans was approximately 1.5 seconds. For each destination IP address targeted, the source IP address was 209.12.44.46. The scanning source corresponding to the source IP address may then be identified by, for example, performing a reverse Domain Name System ("DNS") lookup.

In step 1450, a response procedure is performed. For example, the system administrator may be alerted to the potential scanning activity. In certain situations, no further action may be required. Such instances may occur when the scanning source is a server (e.g., DNS, Network Time Protocol ("NTP"), web, mail, Netnews, etc.) which communicates with many clients. In these instances, the potential scanning activity does not ordinarily warrant further investigation. Potential scanning activity from other sources however, would likely raise suspicion and therefore would require investigation. Such investigation may include communicating with system administrators who manage the network on which the scanning source is located. This may enable the scanning source to be further identified (e.g., a particular computer or group of computers). In addition to investigation, the response procedure may also include preventative measures, such as blocking requests from the scanning source. This may be performed automatically (e.g., when a predetermined number of packets and/or Pings have been sent from the scanning source) or performed at the discretion of the system administrator.

In the exemplary embodiments described above, a 10-minute time interval was used. However, in other embodiments, time intervals of different durations may be used, either alone or together. If the time interval is substantially longer that the duration of the potential scanning activity, the potential scanning activity is unlikely to be noticed because it is small in duration compared to the duration of normal activities. If the time interval is too short, the potential scanning activity may be hard to distinguish from the normal activities. It may therefore be desirable to perform the methods of the present invention using multiple time intervals of various durations. The number and/or length of these multiple time intervals may be affected by considerations such as the amount of time required to execute the methods using the multiple time intervals.

In addition to detecting scanning activity, the methods described above may also be used to detect IP spoofing. By applying the above described methods to source IP addresses rather than destination IP addresses, the user may be able to monitor changes in the number and/or distribution of the source IP addresses. Sudden changes in the number of unique source IP addresses, or changes to the distribution thereof, may indicate that spoofing techniques are being used to impersonate legitimate source IP addresses. Thus, the present invention may be capable of detecting current security violations in addition to anticipating future security violations.

There are many modifications of the present invention which will be apparent to those skilled in the art without departing from the teachings of the present invention. The embodiments disclosed herein are for illustrative purposes only and are not intended to describe the bounds of the present invention, which is to be limited only by the scope of the claims appended hereto.

What is claimed is:

1. A non-transitory computer readable storage medium storing a set of instructions executable by a processor, the set of instructions being operable to:
   receive first data corresponding to usage of a network;
   receive second data corresponding to usage of the network; and
   compare the first data to the second data, wherein comparing the first data to the second data comprises:
      determining a first distribution function for the first data;
      determining a second distribution function for the second data;
      determining one of a) a maximum difference between the first distribution function and the second distribution function, and b) a sum of absolute differences between the first distribution function and the second distribution function; and
   provide an indication of a network event when the one of the maximum difference and the sum of the absolute differences is greater than a first threshold.

2. The computer readable storage medium of claim 1, wherein the data is NetFlow data.

3. The computer readable storage medium of claim 2, wherein the NetFlow data includes one of destination IP address data and source IP address data.

4. The computer readable storage medium of claim 1, wherein the instruction operable to compare the first data to the second data further comprises sub-instructions operable to:
   determine entropy factors for the first data and the second data;
   determine one of an entropy and a steady state entropy from the entropy factors,
   compare the one of the entropy and the steady state entropy to a second threshold; and
   provide an indication of a network event when the one of the entropy and the steady state entropy is greater than the second threshold.

5. The computer readable storage medium of claim 4, wherein the entropy factors include one of data points included in both the first data and the second data, data points included in the first data and not the second data, data points included in the second data and not the first data, and data points not included in either the first data or the second data.

6. The computer readable storage medium of claim 4, wherein the instruction operable to compare the first data to the second data, when the steady state entropy is determined, further includes sub-instructions operable to:
   determine a mean of the steady state entropy;
   determine a variance of the steady state entropy; and
   determine the second threshold using the mean and the variance of the steady state entropy.

7. The computer readable storage medium of claim 1, wherein the network event is a scanning of the network.

8. The computer readable storage medium of claim 1, wherein the first threshold is determined using previously received data.

9. The computer readable storage medium of claim 1, wherein the set of instructions is further operable to:
   graphically represent the first data and the second data.

10. The computer readable storage medium of claim 1, wherein the set of instructions is further operable to:
    perform a response procedure upon detection of the network event.

11. The method of claim 1, wherein the first data is a compilation of data collected over a time period.

12. A system, comprising:
    a processor;
    a memory;
    a data collection module to receive first data corresponding to usage of a network;
    a data collection module to receive second data corresponding to usage of the network;

a comparison module to compare the first data and the second data, wherein the comparing the first data and the second data comprises:
- determining a first distribution function for the first data;
- determining a second distribution function for the second data;
- determining one of a) a maximum difference between the first distribution function and the second distribution function, and b) a sum of absolute differences between the first distribution function and the second distribution function; and an output module to provide an indication of a network event when the one of the maximum difference and the sum of absolute differences is greater than a first threshold.

13. The system of claim 12, wherein the data is NetFlow data.

14. The system of claim 13, wherein the NetFlow data includes one of destination IP address data and source IP address data.

15. The system of claim 12, wherein the comparing the first data and the second data further comprises:
- determining entropy factors for the first data and the second data; and
- determining one of an entropy and a steady state entropy from the entropy factors; and
- comparing the one of the entropy and the steady state entropy to a second threshold, wherein the output module provides an indication of a network event when the one of the entropy and the steady state entropy is greater than the second threshold.

16. The system of claim 15, wherein the entropy factors include one of data points included in both the first data and the second data, data points included in the first data and not the second data, data points included in the second data and not the first data, and data points not included in either the first data or the second data.

17. The method of claim 15, wherein, when the comparison module determines the steady state entropy, further determines a mean and a variance of the steady state entropy and the second threshold using the mean and the variance of the steady state entropy.

18. The system of claim 12, wherein the network event is a scanning of the network.

19. The system of claim 12, wherein the first threshold is determined using previously received data.

20. The system of claim 12, further comprising:
- a graphic module to graphically represent the first data and the second data.

21. The system of claim 12, wherein a response procedure is performed upon detection of the network event.

22. A computer system comprising a memory for storing a set of instructions and a processor for executing the set of instructions, the set of instructions being operable to:
- receive first data corresponding to usage of a network;
- receive second data corresponding to usage of the network;
- compare the first data and the second data, wherein comparing the first data to the second data comprises sub-instructions operable to:
  - determine a first distribution function for the first data;
  - determine a second distribution function for the second data; and
  - determine one of a) a maximum difference between the first distribution function and the second distribution function, and b) a sum of absolute differences between the first distribution function and the second distribution function; and
- provide an indication of a network event when the second data varies from the first data greater than a predetermined threshold.

\* \* \* \* \*